(12) United States Patent
Park et al.

(10) Patent No.: US 12,367,888 B2
(45) Date of Patent: Jul. 22, 2025

(54) ELECTRONIC DEVICE AND CONTROL METHOD THEREOF

(71) Applicant: SAMSUNG ELECTRONICS CO., LTD., Suwon-si (KR)

(72) Inventors: Sangjun Park, Suwon-si (KR); Kihyun Choo, Suwon-si (KR); Taehwa Kang, Suwon-si (KR); Hosang Sung, Suwon-si (KR); Jonghoon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 513 days.

(21) Appl. No.: 17/712,417

(22) Filed: Apr. 4, 2022

(65) Prior Publication Data

US 2022/0262377 A1  Aug. 18, 2022

Related U.S. Application Data

(63) Continuation of application No. PCT/KR2021/012853, filed on Sep. 17, 2021.

(30) Foreign Application Priority Data

Feb. 18, 2021 (KR) ........................ 10-2021-0021583

(51) Int. Cl.
*G10L 21/057* (2013.01)
*G06N 20/00* (2019.01)
(Continued)

(52) U.S. Cl.
CPC .............. *G10L 19/08* (2013.01); *G06N 20/00* (2019.01); *G10L 19/16* (2013.01); *G10L 25/60* (2013.01)

(58) Field of Classification Search
CPC ....... G10L 25/30; G10L 13/047; G10L 13/00; G10L 15/16; G10L 19/16; G10L 15/063;
(Continued)

(56) References Cited

U.S. PATENT DOCUMENTS 10,249,289 B2  4/2019 Chun et al.
10,573,293 B2  2/2020 Bengio et al.
(Continued)

FOREIGN PATENT DOCUMENTS

JP  2020-134920 A  8/2020
JP  2020-149504 A  9/2020
(Continued)

OTHER PUBLICATIONS

Communication dated Jan. 25, 2024, issued by the European Patent Office in counterpart European Application No. 21926890.1.
(Continued)

*Primary Examiner* — Olujimi A Adesanya
(74) *Attorney, Agent, or Firm* — Sughrue Mion, PLLC

(57) ABSTRACT

The disclosure relates to an electronic device and a control method thereof. The electronic device includes a memory, and a processor configured to: obtain first feature data for estimating a waveform by inputting acoustic data of a first quality to a first encoder model; and obtain waveform data of a second quality that is a higher quality than the first quality by inputting the first feature data to a decoder model to.

13 Claims, 13 Drawing Sheets

(51) Int. Cl.
  *G10L 19/08* (2013.01)
  *G10L 19/16* (2013.01)
  *G10L 21/02* (2013.01)
  *G10L 25/60* (2013.01)

(58) Field of Classification Search
  CPC ......... G10L 13/02; G10L 25/60; G10L 13/04; G10L 21/02
  See application file for complete search history.

(56) References Cited

U.S. PATENT DOCUMENTS

| | | | |
|---|---|---|---|
| 10,897,675 B1* | 1/2021 | Tsitovich | G06N 3/08 |
| 10,997,970 B1* | 5/2021 | Rafii | G10L 21/013 |
| 11,003,414 B2 | 5/2021 | Choi et al. | |
| 11,232,782 B2* | 1/2022 | Meng | G10L 15/075 |
| 11,817,111 B2* | 11/2023 | Fejgin | G10L 19/00 |
| 2019/0122651 A1 | 4/2019 | Arik et al. | |
| 2019/0180732 A1 | 6/2019 | Ping et al. | |
| 2019/0325887 A1* | 10/2019 | Karkkainen | G10K 11/17827 |
| 2019/0378498 A1 | 12/2019 | Sainath et al. | |
| 2020/0051583 A1 | 2/2020 | Wu et al. | |
| 2020/0395028 A1 | 12/2020 | Kameoka et al. | |
| 2021/0082398 A1* | 3/2021 | Hori | G06N 3/044 |
| 2021/0082444 A1* | 3/2021 | Fejgin | G10L 19/022 |
| 2021/0118460 A1 | 4/2021 | Kameoka | |
| 2021/0327445 A1* | 10/2021 | Biswas | G10L 19/24 |
| 2021/0343305 A1* | 11/2021 | Jin | G10L 21/0364 |
| 2021/0366461 A1* | 11/2021 | Ahmed | G10L 15/16 |
| 2021/0407057 A1* | 12/2021 | Chopra | G06T 5/50 |
| 2022/0108712 A1* | 4/2022 | Song | G10L 21/0208 |
| 2022/0139070 A1 | 5/2022 | Okamoto et al. | |

FOREIGN PATENT DOCUMENTS

| | | |
|---|---|---|
| JP | 2020-204755 A | 12/2020 |
| JP | 2021-12351 A | 2/2021 |
| KR | 10-2019-0106916 A | 9/2019 |
| WO | 2019/240228 A1 | 12/2019 |
| WO | 2020/205233 A1 | 10/2020 |

OTHER PUBLICATIONS

Communication dated Apr. 15, 2024, issued by the European Patent Office in counterpart European Application No. 21926890.1.

Cheng et al., "A Deep Adaptation Network for Speech Enhancement: Combining a Relativistic Discriminator With Multi-Kernel Maximum Mean Discrepancy," IEEE/ACM Transactions On Audio, Speech, and Language Processing, vol. 29, pp. 41-53, 2021, XP011823990.

Maiti et al., "Parametric Resynthesis With Neural Vocoders," 2019 IEEE Workshop on Applications of Signal Processing to Audio and Acoustics, arXiv:1906.06762v2 [cs.SD], 2019, Total 5 pages.

Shen et al., "Natural TTS Synthesis By Conditioning Wavenet On MEL Spectrogram Predictions, " Proc. ICASSP, pp. 4779-4783, arXiv:1712.05884v2 [cs. CL], 2018, Total 5 pages.

Juvela et al., "Waveform Generation for Text-To-Speech Synthesis Using Pitch-Synchronous Multi-Scale Generative Adversarial Networks," arXiv:1810.12598v1 [eess.AS], 2018, Total 5 pages.

Communication dated Dec. 23, 2021, issued by the International Searching Authority in counterpart International Application No. PCT/KR2021/012853 (PCT/ISA/210 and PCT/ISA/237).

Communication dated Jan. 31, 2025, issued by the Korean Patent Office in Korean Application No. 10-2021-0021583.

Communication dated May 7, 2025, issued by the European Patent Office in European Application No. 21926890.1.

* cited by examiner

ELECTRONIC DEVICE AND CONTROL METHOD THEREOF

CROSS-REFERENCE TO RELATED APPLICATIONS

This application is a bypass continuation of International Application No. PCT/KR2021/012853, filed on Sep. 17, 2021, which is based on and claims priority to Korean Patent Application No. 10-2021-0021583, filed on Feb. 18, 2021, in the Korean Intellectual Property Office, the disclosures of which are incorporated by reference herein in their entireties.

BACKGROUND

1. Field

The disclosure relates to an electronic device and a control method thereof, and more particularly, to an electronic device that obtains high-quality waveform data using an artificial intelligence model, and a control method thereof.

2. Description of Related Art

Conventionally, various algorithms (for example, an algorithm for filtering a noise included in a voice signal, a beamforming-based algorithm, and the like) have been developed and utilized to improve a sound quality of a voice.

Recently, an algorithm for improving a sound quality of a voice based on an artificial intelligence system has been developed. The artificial intelligence system refers to a system that performs training and inferring based on a neural network model unlike an existing rule-based system, and has been utilized in various fields such as voice recognition, image recognition, and future prediction.

In particular, recently, an artificial intelligence system that solves a given problem through a deep neural network based on deep learning has been developed.

Meanwhile, in a case of the deep neural network, the smaller the computational amount, that is, the model complexity, the lower the performance, and the more complex or difficult the task trained to be performed, the lower the performance. Therefore, an approach that lowers the difficulty of the task performed by the deep neural network to improve performance on a limited model complexity is required.

SUMMARY

The disclosure provides an electronic device that obtains waveform data with an improved quality using an artificial intelligence model trained to output high-quality waveform data, and a control method thereof.

According to an aspect of an example embodiment, an electronic device may include a memory; and a processor configured to: input acoustic data of a first quality into a first encoder model; obtain first feature data for estimating a waveform based on inputting the acoustic data of the first quality into the first encoder model; input the first feature data into a decoder model; and obtain waveform data of a second quality that is higher quality than the first quality based on inputting the first feature data into the decoder model, wherein the first encoder model is trained to output feature data for estimating training waveform data of the second quality based on training acoustic data of the first quality being input.

According to an aspect of an example embodiment, control method of an electronic device may include inputting acoustic data of a first quality into a first encoder model; obtaining first feature data for estimating a waveform based on inputting the acoustic data of the first quality into the first encoder model; inputting the first feature data into a decoder model; obtaining waveform data of a second quality that is higher quality than the first quality based on inputting the first feature data into the decoder model, wherein the first encoder model is trained to output feature data for estimating training waveform data of the second quality based on training acoustic data of the first quality being input.

As set forth above, according to the diverse embodiments of the disclosure, waveform data with an improved sound quality may be more efficiently provided to a user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
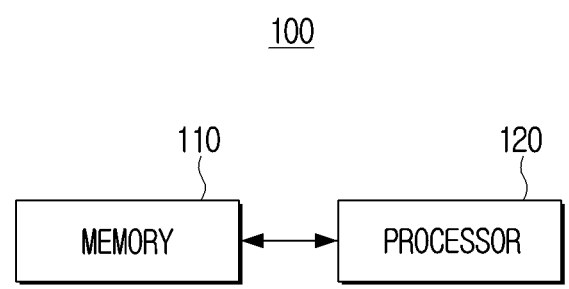
FIG. 1 is a block diagram schematically illustrating components of an electronic device according to an embodiment of the disclosure.

The disclosure relates to an electronic device that obtains waveform data (that is, voice waveform data) of a second quality, which is a higher quality than a first quality, by inputting acoustic data (or acoustic feature data) of the first quality to a neural vocoder, and a control method thereof. Acoustic feature data obtained from a text-to-speech (TTS)

acoustic model (AM) or the like may be input to a neural vocoder model to output a voice waveform.

A voice has static characteristics within a short section (for example, a frame (length section of about 10 to 20 msec)). The acoustic data refers to data related to acoustic characteristics extracted on a specific frame of the voice. The acoustic data may be extracted by performing signal processing (for example, short-time analysis) on the voice. For example, the acoustic data may include at least one of a spectrum, a mel-spectrum, a cepstrum, a pitch lag, and a pitch correlation.

The acoustic data of the first quality refers to data related to acoustic characteristics extracted from voice data of the first quality. For example, the acoustic data of the first quality may refer to data related to acoustic characteristics extracted from a voice obtained through a mobile recording environment (for example, a personalized text-to-speech (PTTS)) or a TTS AM or a band-limited voice. That is, the acoustic data of the first quality may include various noises.

In addition, acoustic data of the second quality, which is a higher quality than the first quality, may refer to, for example, data related to acoustic characteristics extracted from a voice obtained in a studio recording environment. The electronic device according to the disclosure may improve a PTTS or TTS sound quality and extend a bandwidth by obtaining the waveform data of the second quality through the acoustic data of the first quality.

The neural vocoder may include an encoder model, which is a neural network model that outputs feature data for estimating a waveform based on input acoustic data, and a decoder model, which is a neural network model that outputs waveform data based on the feature data. Here, the feature data for outputting the waveform data output from the encoder model is data output from a hidden layer from the perspective of the neural vocoder, and may thus be expressed as a hidden representation.

Meanwhile, noise distributions of the feature data obtained using the acoustic data of the first quality may be various. When the decoder model is trained to output the waveform data of the second quality based on the feature data obtained using the acoustic data of the first quality, a distribution of the feature data may be smoothed. The decoder model according to the disclosure is trained to output the waveform data of the second quality based on feature data obtained using the acoustic data of the second quality, such that performance of the decoder model may be improved. The improvement of the performance of the decoder model may refer to improvement of output performance of high-quality waveform data of the neural vocoder model.

Hereinafter, an embodiment of the disclosure will be described in detail with reference to the accompanying drawings so that those skilled in the art to which the disclosure pertains may easily practice the disclosure.

FIG. 1 is a block diagram schematically illustrating components of an electronic device 100 according to an embodiment of the disclosure. As illustrated in FIG. 1, the electronic device 100 may include a memory 110 and a processor 120. However, the components illustrated in FIG. 1 are examples for implementing embodiments of the disclosure, and other appropriate hardware and software components may be additionally included in the electronic device 100.

The memory 110 may store an instruction or data related to at least one other component of the electronic device 100. The instruction refers to one action statement that the processor 120 may directly execute in a programming language, and is a minimum unit for execution or operation of a program. In addition, the memory 110 is accessed by the processor 120, and readout, recording, correction, deletion, update, and the like, of data in the memory 110 may be performed by the processor 120.

The memory 110 may store data for a neural vocoder and a model included in the neural vocoder to perform various operations. The data for the model included in the neural vocoder to perform various operations may be stored in a memory (for example, a nonvolatile memory) that serves as a storage in the memory 110. The data stored in the memory serving as the storage may be loaded into a memory serving as a main memory in the memory 110.

The memory 110 may include a dialog system, which is an artificial intelligence model capable of recognizing and understanding a voice input and outputting a response message to the voice input. The dialogue system may include an auto speech recognition (ASR) module, a natural language unit (NLU) module, a dialogue manager (DM) module, a TTS module, and the like.

The processor 120 may be electrically connected to the memory 110 to control a general function and operation of the electronic device 100. The processor 120 may input acoustic data of a first quality to a first encoder model to obtain first feature data for estimating a waveform. Here, the first encoder model refers to a neural network model trained to output feature data for estimating training waveform data of a second quality when training acoustic data of the first quality is input.

The processor 120 may input the first feature data to a decoder model to obtain waveform data of a second quality, which is a higher quality than the first quality.

In an embodiment, the processor 120 may input training acoustic data of the first quality to the first encoder model to obtain second feature data. The processor 120 may train the first encoder model based on an error between the second feature data and the feature data for estimating the training waveform data of the second quality. An embodiment related to this will be described in detail with reference to FIG. 2.

In another embodiment, the processor 120 may input the first feature data and condition information of a waveform to be output by the decoder model to the decoder model to obtain waveform data corresponding to the condition information. An embodiment related to this will be described in detail with reference to FIG. 3.

A function related to artificial intelligence according to the disclosure is operated through the processor 120 and the memory 110. The processor 120 may include one or more processors. In this case, the one or more processors are general-purpose processors such as a central processing unit (CPU), an application processor (AP), and a digital signal processor (DSP), graphics-dedicated processors such as a graphic processing unit (GPU) and a vision processing unit (VPU), or artificial intelligence-dedicated processors such as a neural processing unit (NPU).

One or more processors 120 perform control to process input data according to a predefined operation rule or artificial intelligence model stored in the memory 110. Alternatively, when one or more processors are the artificial intelligence-dedicated processors, the artificial intelligence-dedicated processors may be designed as a hardware structure specialized for processing a specific artificial intelligence model.

The predefined operation rule or artificial intelligence model is created through training. Here, the creation through the training means that a predefined operation rule or artificial intelligence model set to perform a desired characteristic (or purpose) is created by training a basic artificial intelligence model using a plurality of training data by a training algorithm. Such training may be performed in a device itself on which the artificial intelligence according to the disclosure is performed or may be performed through a separate server and/or system.

Examples of the training algorithm include supervised training, unsupervised training, semi-supervised training, or reinforcement training, but are not limited thereto.

The artificial intelligence model includes a plurality of artificial neural networks, and the artificial neural network may include a plurality of neural network layers. Each of the plurality of neural network layers has a plurality of weight values, and performs a neural network operation through an operation between an operation result of the previous layer and the plurality of weights. The plurality of weights of the plurality of neural network layers may be optimized by a training result of the artificial intelligence model. For example, the plurality of weights may be updated so that a loss value or a cost value obtained from the artificial intelligence model during a training process is decreased or minimized.

Examples of the artificial neural network include a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-Networks, and the like, and the artificial neural network in the disclosure is not limited to the example described above except for a case where it is specified.

Figure 2:
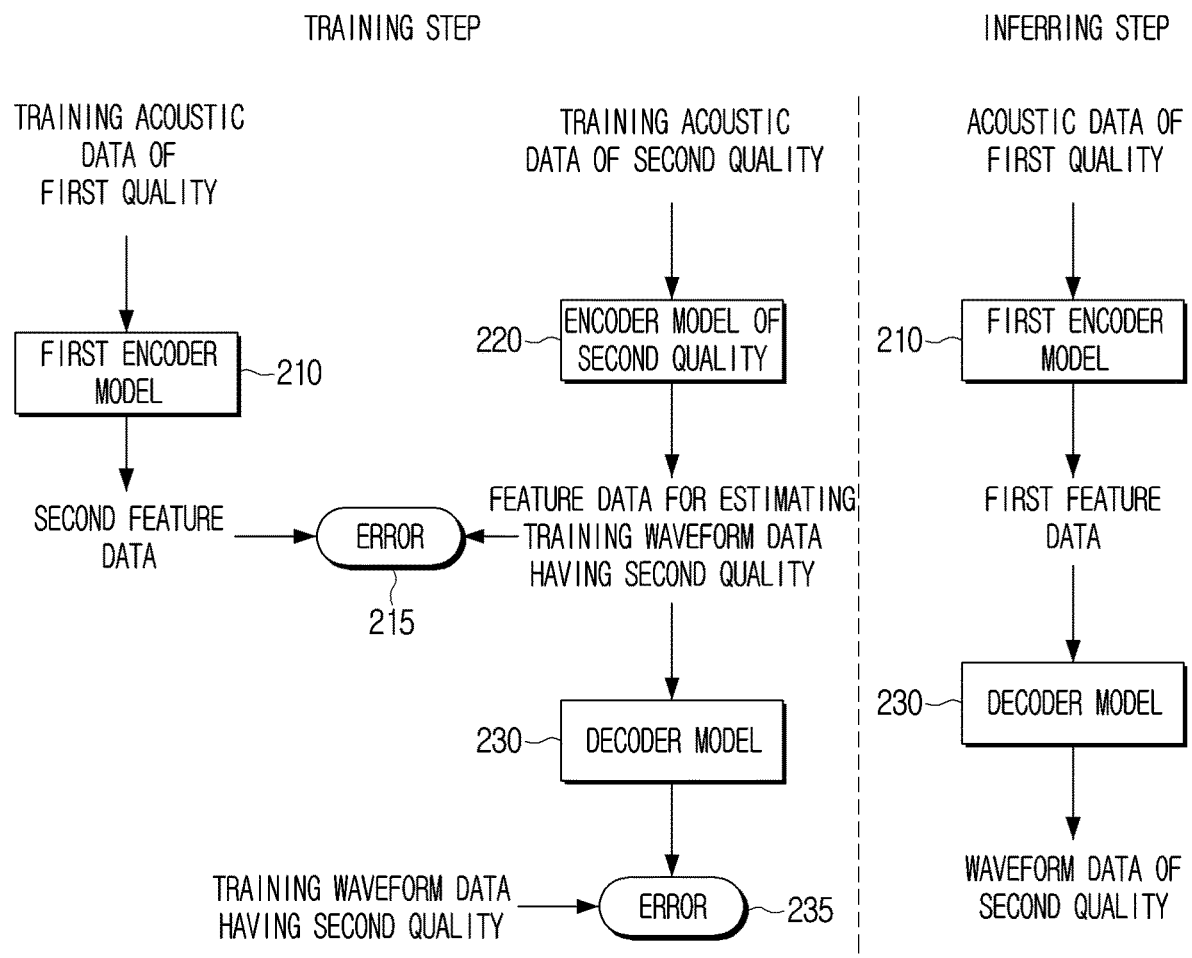
FIGS. 2 and 3 are views for describing a process of obtaining waveform data of a second quality by the electronic device according to an embodiment of the disclosure.

FIG. 2 is a view for describing a process of obtaining waveform data of a second quality by the electronic device 100 according to an embodiment of the disclosure.

As illustrated in a training step, the processor 120 may train a first encoder model 210 and a decoder model 230. Specifically, the processor 120 may input training acoustic data of a first quality to the first encoder model 210 to obtain second feature data. In addition, the processor 120 may input training acoustic data of a second quality to an encoder model 220 of the second quality to obtain feature data for estimating training waveform data of the second quality.

In this case, each of the training acoustic data of the first quality and the training acoustic data of the second quality are training data of which only qualities are different from each other and the remaining components are the same as each other. That is, the training acoustic data of the first quality and the training acoustic data of the second quality are a pair of training data. In addition, the encoder model 220 of the second quality refers to an encoder model trained to output feature data for estimating waveform data using the acoustic data of the second quality. The encoder model 220 of the second quality may be used only in the training step.

The processor 120 may train the first encoder model 210 based on an error 215 between the second feature data and the feature data for estimating the training waveform data of the second quality. That is, the first encoder model 210 may be trained to output the feature data for estimating the training waveform data of the second quality using the training acoustic data of the first quality. In this case, the error 215 may refer to a mean square error (MSE) loss between the second feature data and the feature data for estimating the training waveform data of the second quality. When the training is completed, the first encoder model 210 may output first feature data using the training acoustic data of the first quality.

In addition, the processor 120 may input the feature data for estimating the training waveform data of the second quality to a decoder model 230 to obtain waveform data. The processor 120 may train the decoder model 230 based on an error 235 between the obtained waveform data and the training waveform data of the second quality. In this case, the error 235 may refer to a cross entropy (CE) loss between the obtained waveform data and the training waveform data of the second quality. That is, the decoder model 230 may be trained to output the training waveform data of the second quality when the feature data for estimating the training waveform data of the second quality is input.

Because the decoder model 230 is not trained to output the training waveform data of the second quality using feature data of the first quality, a distribution of the feature data input during training is not smoothed. That is, the decoder model 230 is trained to output the training waveform data of the second quality using the feature data of the second quality, such that sound quality improvement performance may increase.

As illustrated in an inferring step of FIG. 2, when acoustic data of the first quality is extracted after the first encoder model 210 and the decoder model 230 are trained, the processor 120 may input the extracted acoustic data of the first quality to the trained first encoder model 210 to obtain first feature data. Because the first encoder model 210 is trained to output the first feature data in the training step, an output of the first encoder model 210 may be similar to (e.g., within an error range) or may be the same as the feature data that the encoder model 220 of the second quality outputs using the acoustic data of the second quality. The processor 120 may input the first feature data to the trained decoder model 230 to obtain waveform data of the second quality.

Figure 3:
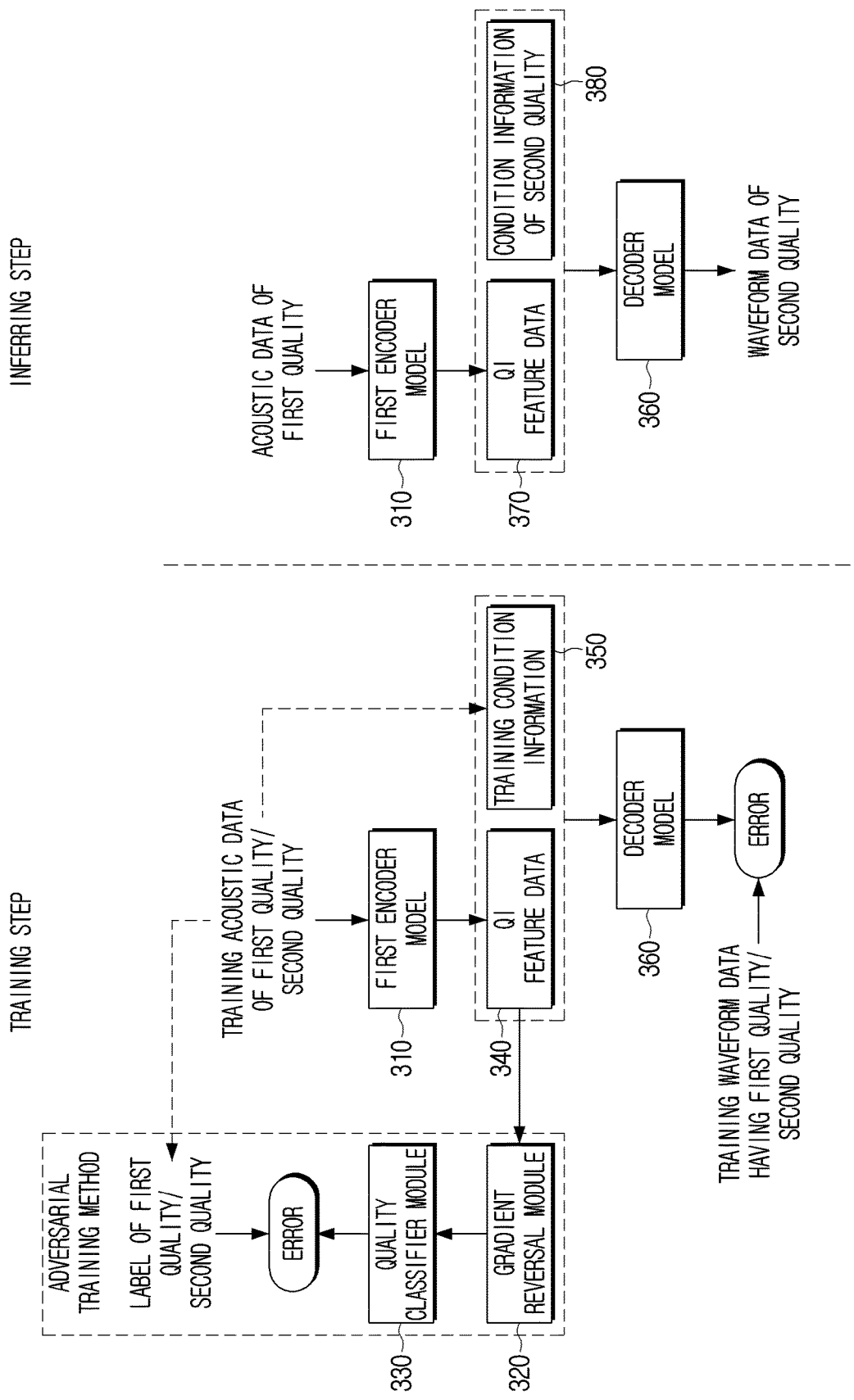

FIG. 3 is a view for describing a process of obtaining waveform data of a second quality by the electronic device 100 according to an embodiment of the disclosure. As illustrated in a training step of FIG. 3, the processor 120 may train a first encoder model 310 and a decoder model 360.

In the training step, as an embodiment, the processor 120 may train the first encoder model 310 to output quality-independent first feature data through an adversarial training method. Specifically, the processor 120 may input one of acoustic data of a first quality or a second quality to the first encoder model 310 to obtain one of feature data of the first quality or feature data of the second quality.

The processor 120 may input the feature data obtained through the first encoder model 310 to a gradient reversal module 320. The gradient reversal module 320 refers to a module that allows the first encoder model 310 to be trained in a direction in which a quality of feature data may not be classified by assigning a negative value to a gradient (that is, multiplying the gradient by −1) when the first encoder model 310 is trained through a back propagation method. That is, the gradient reversal module 320 is a module used when the first encoder model 310 may not classify the quality and is trained to output quality-independent feature data. The gradient reversal module 320 does not affect input data in a forwarding step. Therefore, when the feature data is input in the forwarding step, the same data as the feature data input to the gradient reversal module 320 may be output as it is.

The processor 120 may input the feature data to a quality classifier module 330 to classify the feature data into a first quality or a second quality. The processor 120 may train the quality classifier module 330 based on an error (for example, a CE loss (adversarial loss)) between a label indicating the quality of the acoustic data input to the first encoder model 310 and the quality classified through the quality classifier module 330. For example, the processor 120 may train the quality classifier module 330 to be accurately able to classify the quality of the input feature data (that is, train the quality classifier module 330 to reduce the error) using a back propagation method.

The processor 120 may multiply the gradient by −1 in a training process of the back propagation method through the gradient reversal module 320. That is, the quality classifier module 330 is trained to classify the quality of the output of the first encoder model 310 well, and the first encoder model 310 is trained so that quality information is not included in the output. In addition, the processor 120 may train the first encoder model 310 to output quality-independent first feature data (hereinafter, "QI feature data") 340. Meanwhile, due to the first encoder model 310, when the training acoustic data of the first quality and the training acoustic data of the second quality are training data of which only qualities are different from each other and the remaining components are the same as each other, the QI feature data output using the training acoustic data of the first quality and the QI feature data output using the training acoustic data of the second quality may become implicitly the same as each other. That is, the first encoder model 310 may be trained to output feature data of which information other than the quality is the same even though the acoustic data of the first quality or the second quality is input.

The processor 120 may input the QI feature data 340 and training condition information 350 to the decoder model 360 to obtain waveform data corresponding to the training condition information 350. Characteristics for the quality may not be included in the QI feature data. That is, a factor for the quality may be disentangled from the QI feature data. The condition information may include information on a waveform to be output by the decoder model 360 (for example, quality information on a waveform to be output).

The training condition information 350 may include information corresponding to the quality of the acoustic data input to the first encoder model 310. When the acoustic data of the first quality is input to the first encoder model 310, the training condition information 350 may include information indicating that the waveform to be output by the decoder model 360 is a waveform of the first quality. In addition, when the acoustic data of the second quality is input to the first encoder model 310, the training condition information 350 may include information indicating that the waveform to be output by the decoder model 360 is a waveform of the second quality.

For example, when the training condition information 350 includes the information indicating that the waveform to be output by the decoder model 360 is the waveform of the second quality, the decoder model 360 may output waveform data of the second quality using the QI feature data. The processor 120 may train the decoder model 360 to output waveform data of the second quality based on an error between the waveform data output by the decoder model 360 and training waveform data of the second quality.

For example, when the training condition information 350 includes the information indicating that the waveform to be output by the decoder model 360 is the waveform of the first quality, the decoder model 360 may output waveform data of the first quality using the QI feature data. The processor 120 may train the decoder model 360 to output waveform data of the first quality based on an error between the waveform data output by the decoder model 360 and training waveform data of the first quality.

That is, the decoder model 360 may be trained to output the training waveform data of the first quality based on the feature data obtained using the training acoustic data of the first quality, and may be trained to output the training waveform data of the second quality based on the feature data obtained using the training acoustic data of the second quality. Therefore, the decoder model 360 may be trained to output waveform data with improved performance.

As illustrated in an inferring step of FIG. 3, the processor 120 may input acoustic data of the first quality to the trained first encoder model 310 to obtain QI feature data 345. The processor 120 may input the QI feature data 345 and condition information 380 of the second quality including information indicating that waveform data to be output by the decoder model 360 is waveform data of the second quality to the trained decoder model 360 to obtain the waveform data of the second quality. Therefore, the decoder model 360 may output waveform data with improved performance.

Figure 4:
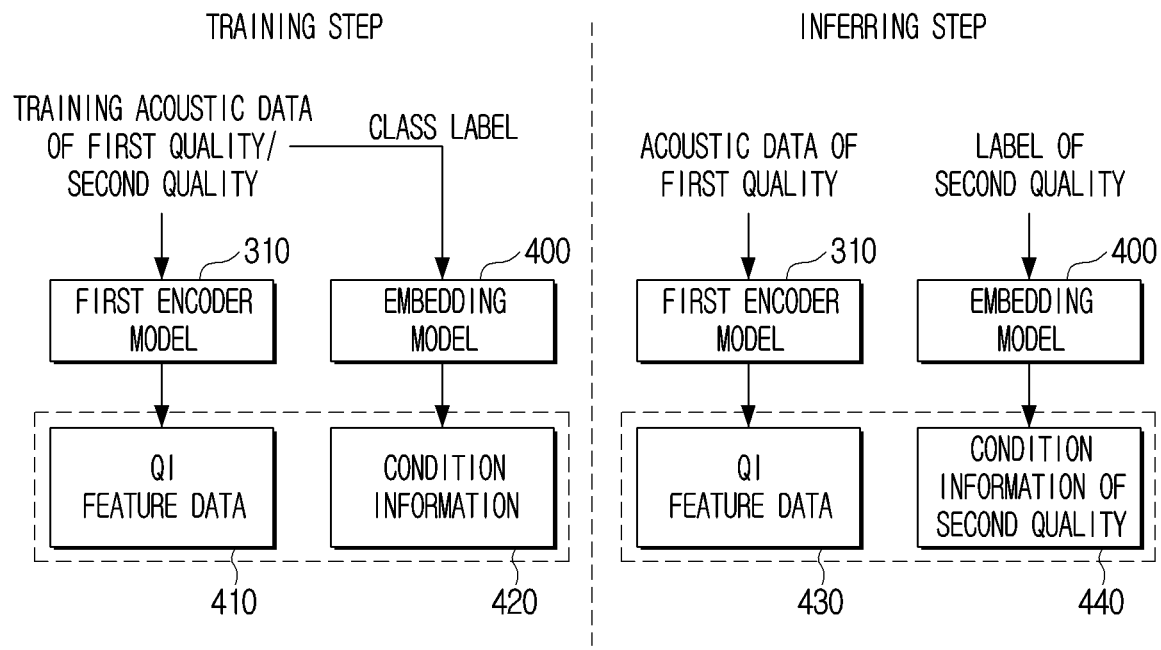
FIGS. 4 and 5 are views for describing a process of obtaining condition information by the electronic device according to an embodiment of the disclosure.
Figure 5:
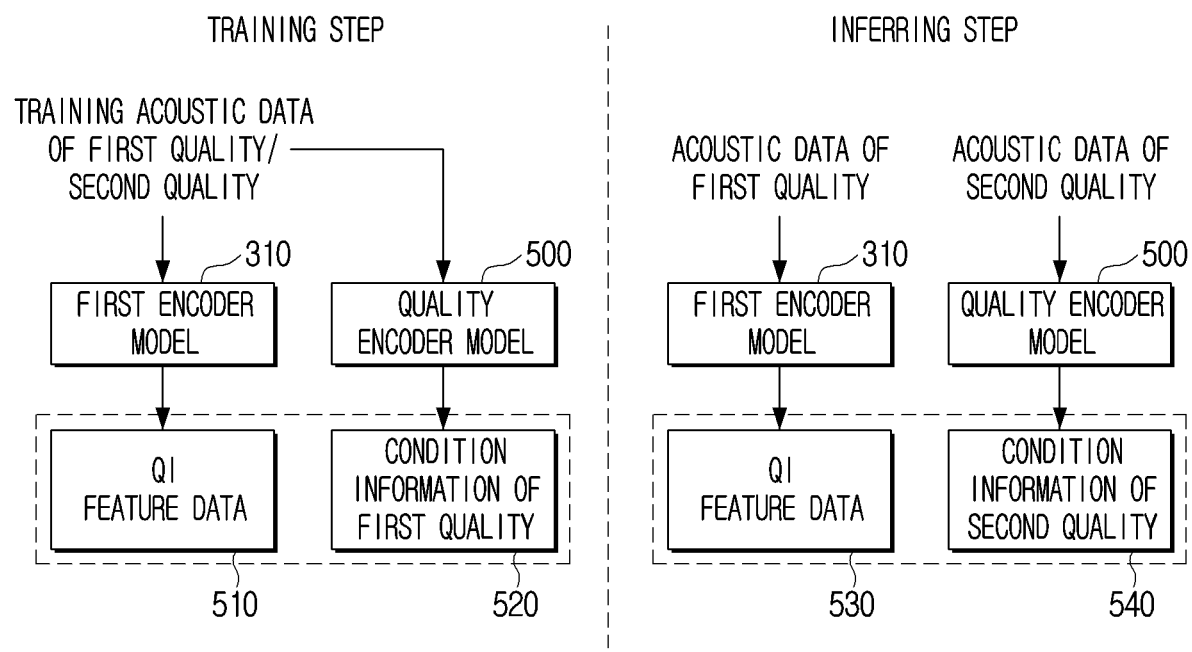

FIGS. 4 and 5 are views for describing a process of obtaining condition information by the electronic device 100 according to an embodiment of the disclosure. That is, FIGS. 4 and 5 are views for describing a process of obtaining condition information described with reference to FIG. 3.

FIG. 4 is a view for describing a process of obtaining condition information in a supervised training manner by the electronic device 100. In a training step, the processor 120 may input training acoustic data of the first quality or training acoustic data of the second quality to a first encoder model 310 to obtain QI feature data 410. A process of training the first encoder model 310 to output the QI feature data 410 has been described above, and an overlapping description will thus be omitted.

In this case, the processor 120 may input a class label corresponding to the quality of the training acoustic data input to the first encoder model 310 to an embedding model 400 and allow the embedding model 400 to output condition information 420. The embedding model 400 refers to an artificial intelligence model trained to output condition information corresponding to the input class label. That is, the embedding model 400 may be trained to output embedding data of the condition information corresponding to the class label. Here, the embedding data may be implemented in the form of a vector, but is not limited thereto, and may be implemented in the form of a matrix, a graph, or the like.

As an example, when the class label including information indicating that the quality of the training acoustic data input to the first encoder model 310 is the first quality is input to the embedding model 400, the embedding model 400 may be trained to output the condition information 420 including information indicating that a waveform to be output by a decoder model is a wavelength of the first quality.

As another example, when the class label including information indicating that the quality of the training acoustic data input to the first encoder model 310 is the second quality is input to the embedding model 400, the embedding model 400 may be trained to output the condition information 420 including information indicating that a waveform to be output by the decoder model is a wavelength of the second quality.

As illustrated in an inferring step of FIG. 4, the processor 120 may input acoustic data of the first quality to the first encoder model 310 to obtain QI feature data 430. The processor 120 may input a class label corresponding to the second quality (that is, a label of the second quality) to the trained embedding model 400 to obtain condition information 440 of the second quality (that is, information indicating that the waveform to be output by the decoder model is the waveform of the second quality). In addition, the processor 120 may input the QI feature data 430 and the condition information 440 of the second quality to the decoder model to obtain waveform data of the second quality.

FIG. 5 is a view for describing a process of obtaining condition information in an unsupervised training manner by the electronic device 100. In a training step of FIG. 5, the processor 120 may input training acoustic data of the first quality or training acoustic data of the second quality to a first encoder model 310 to obtain QI feature data 510. A process of training the first encoder model 310 to output the QI feature data 510 has been described above, and an overlapping description will thus be omitted.

In this case, the processor 120 may input the training acoustic data input to the first encoder model 310 to a quality encoder model 500 and allow the quality encoder model 500 to output condition information 520 of the first quality. The quality encoder model 500 refers to an artificial intelligence model trained to output condition information corresponding to the quality of the training acoustic data using characteristics, or the like, included in the input training acoustic data. The quality encoder model 500 may include at least one of a reference encoder structure, a global style token (GST) structure, or a variational auto encoder (VAE) structure.

When the training acoustic data is input, the quality encoder model 500 may be trained to detect at least one feature vector including characteristics of the training acoustic data (for example, characteristics capable of representing the quality of the training acoustic data) and output condition information corresponding to the quality of the training acoustic data based on the detected feature vector.

As an example, when the training acoustic data of the first quality is input, the quality encoder model 500 may be trained to output condition information of the first quality (that is, information indicating that a waveform to be output by a decoder model is a waveform of the first quality) based on at least one feature vector included in the input training acoustic data.

As another example, when the training acoustic data of the second quality is input, the quality encoder model 500 may be trained to output condition information of the second quality (that is, information indicating that a waveform to be output by the decoder model is a waveform of the second quality) based on at least one feature vector included in the input training acoustic data.

In an inferring step, the processor 120 may input acoustic data of the first quality to the trained first encoder model 310 to obtain QI feature data 530. The processor 120 may input acoustic data of the second quality to the quality encoder model 500 to obtain condition information 540 of the second quality. The processor 120 may input the obtained QI feature data 530 and the condition information 540 of the second quality to the decoder model to obtain waveform data of the second quality.

Unlike the embedding model 400 of FIG. 4, the quality encoder model 500 of FIG. 5 does not output discrete condition information, and outputs continuous quality condition information. Because the acoustic data of the first quality includes various noises, even though the training acoustic data of the first quality is input, an output of the quality encoder model 500 may be various.

Meanwhile, the embedding model 400 and the quality encoder model 500 described with reference to FIGS. 4 and 5, respectively, may be expressed as condition models trained to output the condition information. That is, the processor 120 may input the label indicating the second quality or the acoustic data of the second quality to the trained condition model to obtain the condition information indicating that the waveform to be output by the decoder model is the waveform of the second quality. In addition, the processor 120 may input the condition information of the second quality obtained through the condition model and the QI feature data to the decoder model to obtain the waveform data of the second quality.

Figure 6:
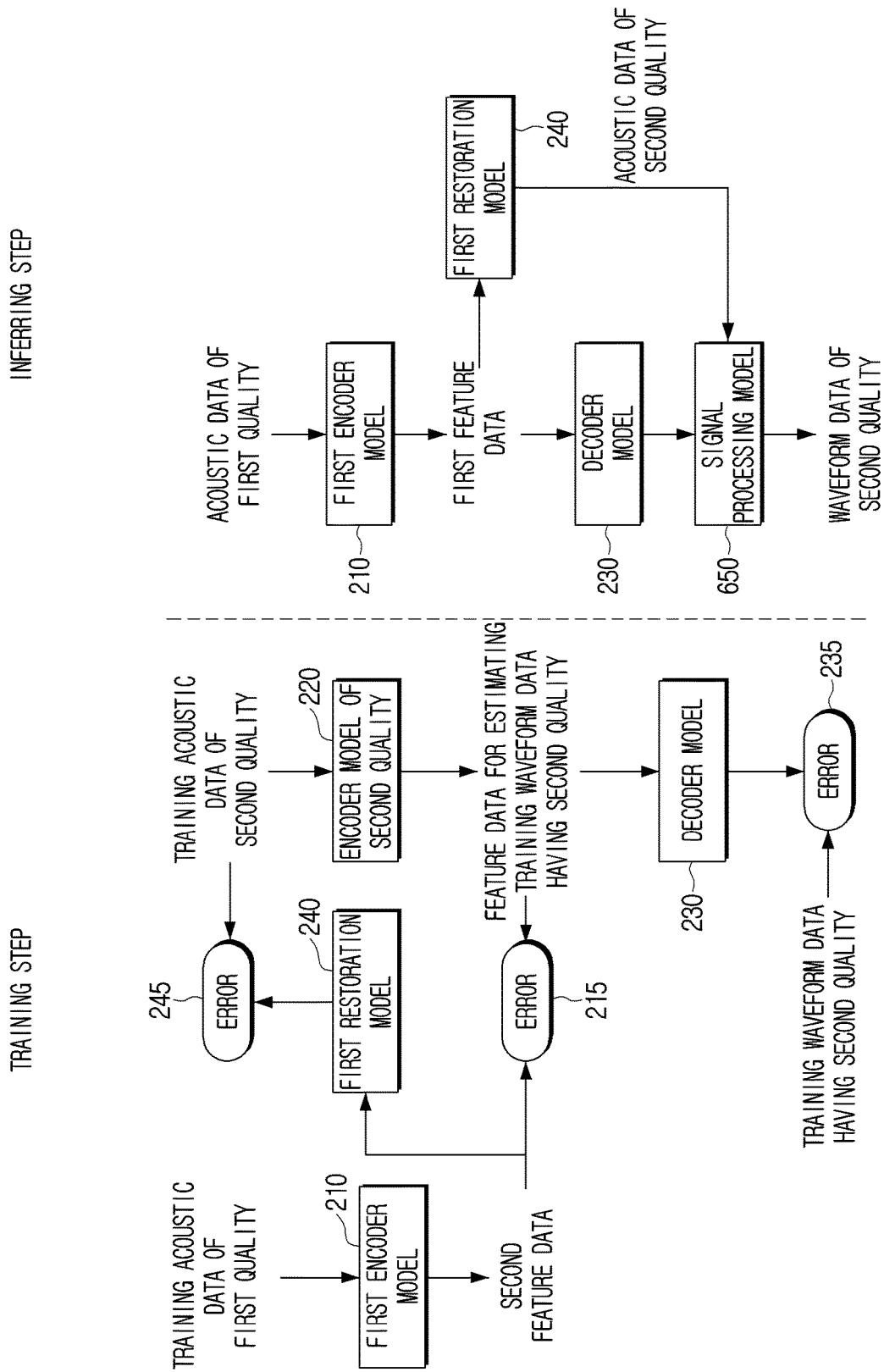
FIG. 6 is a view for describing a process of obtaining acoustic data by the electronic device according to an embodiment of the disclosure using a first restoration model.

FIG. 6 is a view for describing a process of obtaining acoustic data by the electronic device according to an embodiment of the disclosure using a first restoration model. FIG. 6 is a view for describing a method of restoring feature data to acoustic data using a first restoration model 240 when the electronic device 100 obtains the waveform data of the second quality in the manner described with reference to FIG. 2.

The restored acoustic data may be utilized for various signal processing models, or the like. In this embodiment, a method in which a decoder model 230 estimates an excitation signal and a signal processing model 650 receives the estimated excitation signal and the restored acoustic data and outputs waveform data of second quality through linear prediction will be described.

In a training step, the processor 120 may input training acoustic data of the first quality to a first encoder model 210 to obtain second feature data. The processor 120 may input the second feature data to the first restoration model 240 to obtain (or restore) acoustic data with an improved quality.

The first restoration model 240 refers to an artificial intelligence model that restores feature data for estimating a waveform output from the encoder model to acoustic data.

The processor 120 may train the first restoration model 240 based on an error 245 between the acoustic data with an improved quality output from the first restoration model 240 and training acoustic data of the second quality. That is, the first restoration model 240 may be trained to output the training acoustic data of the second quality based on the second feature data based on the error 245. Meanwhile, an operation illustrated in the training step of FIG. 6 has been described with reference to FIG. 2, and an overlapping description will thus be omitted.

In an inferring step, the processor 120 may input acoustic data of the first quality to the trained first encoder model 210 to obtain first feature data. The processor 120 may input the first feature data to the decoder model 230 to obtain an excitation signal. A description for the excitation signal will be provided later. Meanwhile, the processor 120 may input the first feature data to the trained first restoration model 240 to obtain acoustic data of the second quality.

The processor 120 may input the excitation signal and acoustic data of the second quality to the signal processing model 650 to obtain waveform data of the second quality. Here, the signal processing model 650 may be a linear prediction module.

Specifically, a voice signal may be separated into a prediction signal and an excitation signal as illustrated in Equation 1 using a linear prediction technique. In Equation 1, $p_t$ refers to a prediction signal at time t, $s_t$ denotes a voice signal at time t, and $a_k$ denotes a linear prediction coefficient.

$$p_t = \sum_{k=1}^{M} a_k s_{t-k}$$ [Equation 1]

In addition, the excitation signal refers to a difference between the voice signal and the prediction signal, and may be expressed by Equation 2. In Equation 2, $e_t$ refers to an excitation signal.

$$s_t = p_t + e_t \quad \text{[Equation 2]}$$

The signal processing model 650 may calculate a linear prediction coefficient through the acoustic data. For example, the signal processing model 650 may calculate the linear prediction coefficient through the acoustic data using a Levinson-Dubin algorithm or the like. When low-quality acoustic data is used when calculating the linear prediction coefficient, a sound quality of the finally output waveform data may be deteriorated. Therefore, the processor 120 may input the acoustic data of the second quality to the signal processing model 650 using the first restoration model 240 to obtain a linear prediction coefficient.

In addition, the processor 120 may obtain the waveform data of the second quality using the linear prediction coefficient calculated through the signal processing model 650 and the excitation signal.

The waveform data of the second quality output by the signal processing model 650 may be expressed by Equation 3. In Equation 3, $\hat{e}_t$ refers to the excitation signal output from the decoder model 230, $\hat{s}_t$ refers to the waveform data of the second quality, and $a_k$ refers to the linear prediction coefficient.

$$\hat{s}_t = \sum_{k=1}^{M} a_k \hat{s}_{t-k} + \hat{e}_t \quad \text{[Equation 3]}$$

Figure 7:
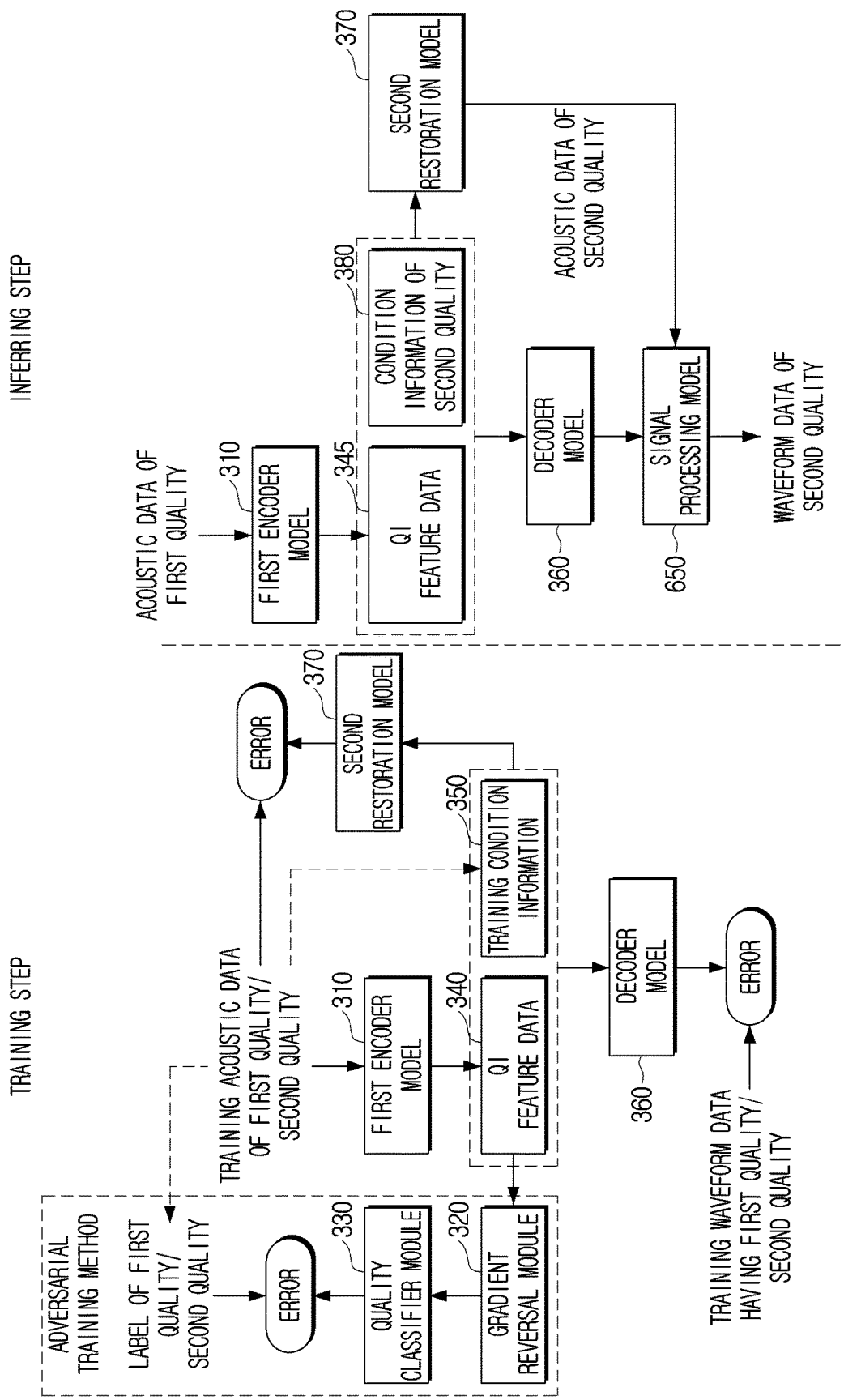
FIG. 7 is a view for describing a process of obtaining acoustic data by the electronic device according to an embodiment of the disclosure using a second restoration model.

FIG. 7 is a view for describing a process of obtaining acoustic data by the electronic device according to an embodiment of the disclosure using a second restoration model. FIG. 7 is a view for describing a method of restoring feature data to acoustic data using a second restoration model when the electronic device 100 obtains the waveform data of the second quality in the manner described with reference to FIG. 3.

The restored acoustic data may be utilized for various signal processing models or the like. Similar to FIG. 6, in FIG. 7, a method in which a decoder model 360 estimates an excitation signal and a signal processing model 650 receives the estimated excitation signal and the restored acoustic data and outputs waveform data of second quality through linear prediction will be described. In a training step, the processor 120 may train a first encoder model 310 so that the first encoder model 310 outputs QI feature data based on training acoustic data of the first quality or the second quality. A process of training the first encoder model 310 has been described in detail with reference to FIG. 3, and an overlapping description will thus be omitted.

Meanwhile, the processor 120 may train a second restoration model 370 so that the second restoration model 370 outputs (or restores) acoustic data of a quality corresponding to training condition information 350, based on QI feature data 340 and the training condition information 350.

For example, when the training condition information 350 includes information indicating that the QI feature data 340 is acquired through the training acoustic data of the first quality, the second restoration model 370 may output (or restore) acoustic data of the first quality using the QI feature data 340. The processor 120 may train the second restoration model 370 based on an error between the acoustic data of the first quality output from the second restoration model 370 and the training acoustic data of the first quality input to the first encoder model 310. That is, the second restoration model 370 may be trained to restore the acoustic data of the quality corresponding to the training condition information 350 using the QI feature data 340 and the training condition information 350.

In an inferring step, the processor 120 may input acoustic data of the first quality to the trained first encoder model 310 to obtain QI feature data 370. In addition, the processor 120 may input the QI feature data 370 and condition information 380 of the second quality to the decoder model 360 to obtain an excitation signal.

Meanwhile, the processor 120 may input the QI feature data 370 and the condition information 380 of the second quality to the trained second restoration model 370 to obtain acoustic data of the second quality. The processor 120 may input the excitation signal and the acoustic data of the second quality to the signal processing model 650 to obtain waveform data of the second quality. A process of obtaining the waveform data of the second quality by the processor 120 using the signal processing model 650 has been described in detail with reference to FIG. 6, and an overlapping description will thus be omitted.

Figure 8:
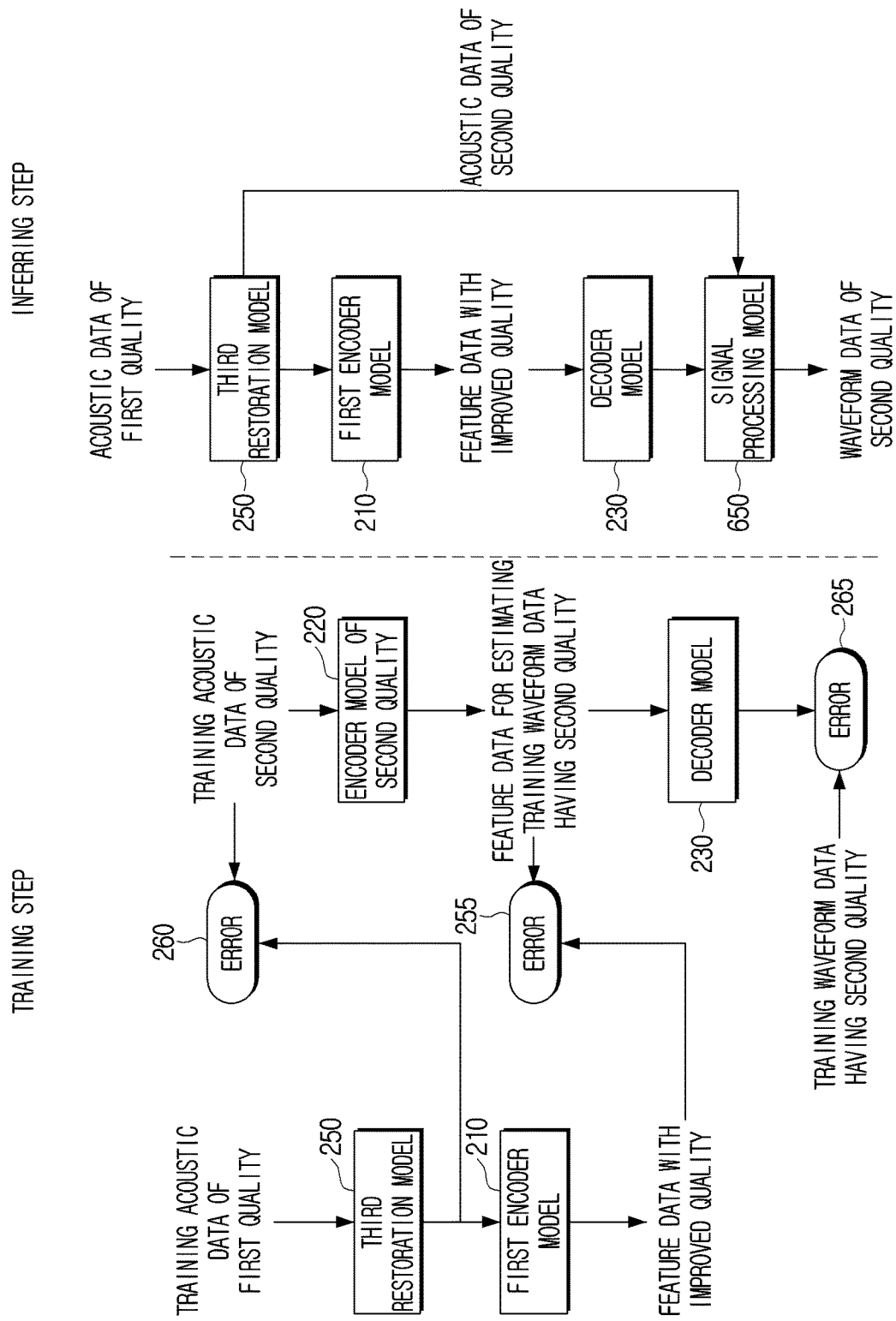
FIG. 8 is a view for describing a process of obtaining acoustic data by the electronic device according to an embodiment of the disclosure using a third restoration model.

FIG. 8 is a view for describing a process of obtaining acoustic data by the electronic device 100 according to an embodiment of the disclosure using a third restoration model. FIG. 8 is a view for describing a method of restoring feature data to acoustic data using a third restoration model when the electronic device 100 obtains the waveform data of the second quality in the manner described with reference to FIG. 2.

In a training step, the processor 120 may input training acoustic data of the first quality to a third restoration model 250 to obtain acoustic data with an improved quality. The processor 120 may train the third restoration model 250 based on an error 260 between the acoustic data output from the third restoration model 250 and training acoustic data of the second quality. That is, the third restoration model 250 may be trained to output (or restore) acoustic data of the second quality when acoustic data of the first quality is input.

The processor 120 may input the acoustic data of the second quality obtained through the third restoration model 250 to a first encoder model 210 to obtain feature data for estimating a waveform. In this case, the feature data output from the first encoder model 210 may be data with an improved quality as compared with the second feature data described with reference to FIG. 2.

In addition, the processor 120 may train the first encoder model 210 based on an error 255 between the feature data with an improved quality and feature data for estimating training waveform data of the second quality, output from an encoder model 220 of the second quality. An embodiment related to this has been described in detail with reference to FIG. 2, and an overlapping description will thus be omitted.

In an inferring step, the processor 120 may input acoustic data of the first quality to the third restoration model 250 to obtain acoustic data of the second quality. The processor 120 may input the acoustic data of the second quality to the first encoder model 210 to obtain feature data with an improved quality as compared with first feature data. The processor 120 may input the feature data with an improved quality to a decoder model 230 to obtain an excitation signal.

The processor 120 may input the acoustic data of the second quality and the excitation signal to a signal processing model 650 to obtain waveform data of the second quality. A process of obtaining the waveform data of the second quality through the signal processing model 650 has been described above, and an overlapping description will thus be omitted.

Figure 9:
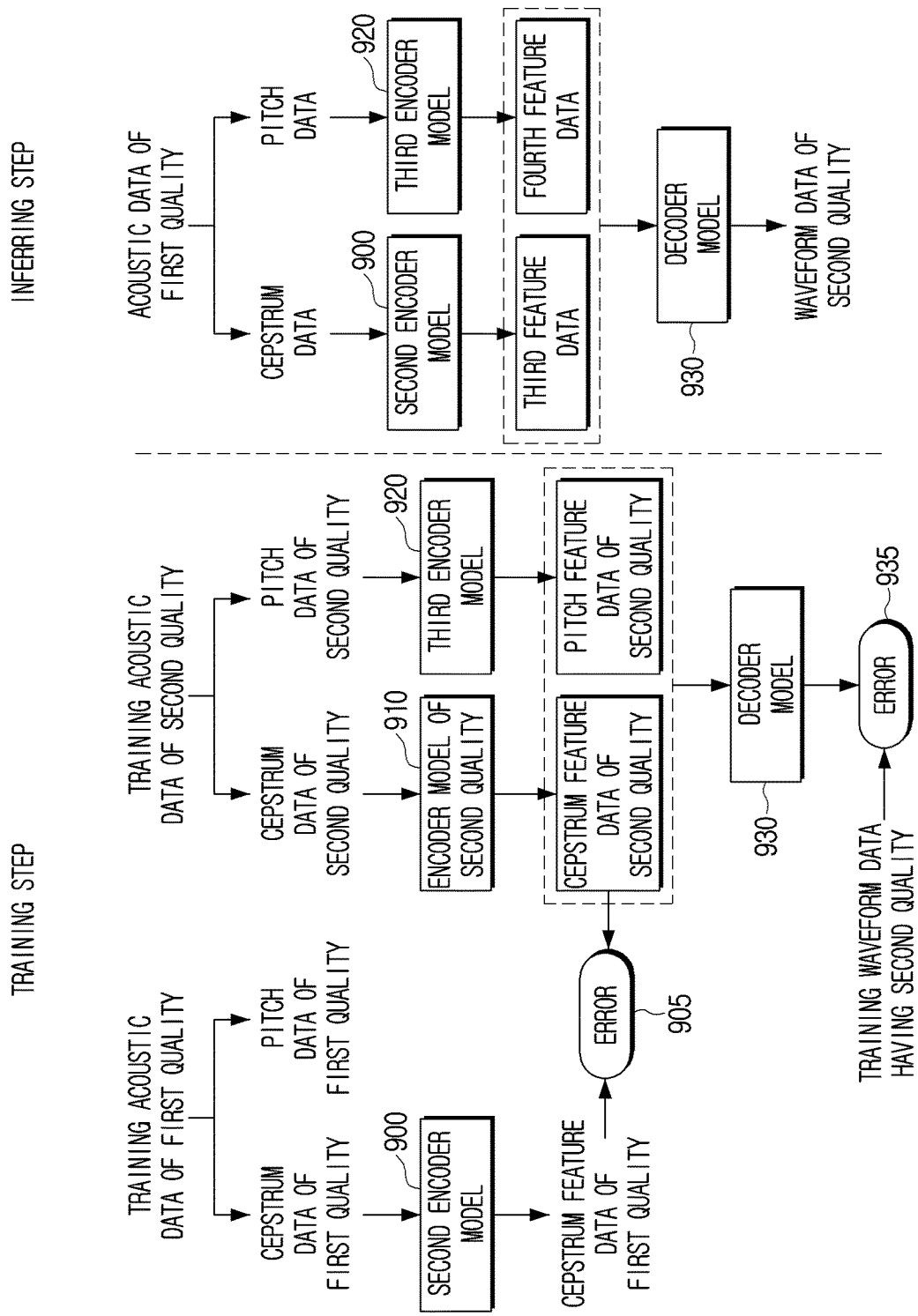
FIGS. 9 and 10 are views for describing a process of outputting waveform data with an improved quality related to a first domain by the electronic device according to an embodiment of the disclosure.

FIG. 9 is a view for describing a process of outputting waveform data with an improved quality related to a first domain by the electronic device 100 according to an embodiment of the disclosure. That is, FIG. 9 is a view for describing a method in which the electronic device 100 enhances only a specific type of acoustic data of all acoustic data.

Meanwhile, a domain of the acoustic data refers to a type of the acoustic data, and may include, for example, a spectrum, a mel-spectrum, a cepstrum, and pitch data (for example, a pitch lag and a pitch correlation).

As an example, when it is desired to extend a bandwidth of a voice signal, it may be preferable not to change the pitch data of the acoustic data in terms of sound quality improvement. As another example, when it is desired to improve a sound quality for PTTS, it may be preferable not to change the pitch correlation in terms of sound quality improvement. Therefore, the electronic device 100 may improve only a quality related to a first domain among acoustic data through a method to be described later.

In a training step, the processor 120 may input first acoustic data related to the first domain among training acoustic data of the first quality to a second encoder model 900 to obtain feature data related to the first domain of the first quality. The feature data related to the first domain refers to data related to the first domain for estimating waveform data. For example, as illustrated in FIG. 9, the processor 120 may input cepstrum data of the first quality among the training acoustic data of the first quality to the second encoder model 900 to obtain cepstrum feature data of the first quality.

Meanwhile, the processor 120 may input data related to the first domain among training acoustic data of the second quality to an encoder model 910 of the second quality to obtain feature data related to the first domain of the second quality. For example, the processor 120 may input cepstrum data of the second quality among the training acoustic data of the second quality to the encoder model 910 of the second quality to obtain cepstrum feature data of the second quality.

The processor 120 may train the second encoder model 900 based on an error 905 between the feature data related to the first domain of the first quality and the feature data related to the first domain of the second quality. That is, the second encoder model 900 may be trained to output the feature data related to the first domain of the second quality using the data related to the first domain of the first quality.

Meanwhile, the processor 120 may input data related to a second domain of the second quality among the training acoustic data of the second quality to a third encoder model 920 to obtain feature data related to the second domain of the second quality. In addition, the processor 120 may input the feature data related to the first domain of the second quality (for example, the cepstrum feature data of the second quality) and the feature data related to the second domain of the second quality (for example, pitch feature data of the second quality) to a decoder model 930 to obtain waveform data.

In addition, the processor 120 may train the decoder model 930 based on an error 935 between the obtained waveform data and training waveform data of the second quality. That is, the decoder model 930 may be trained to output the training waveform data of the second quality using the feature data related to the first domain and the second domain of the second quality.

As illustrated in an inferring step of FIG. 9, in an embodiment, acoustic data of the first quality may include cepstrum data and pitch data. The cepstrum data may have spectral envelope information (for example, pronunciation, channel, and noise information). Because the pitch data is not affected by noise, it may be preferable to utilize the pitch data as it is. Therefore, the electronic device 100 may improve only data (cepstrum data) of a specific domain among the acoustic data and utilize data (pitch data) of the remaining domains as it is.

The processor 120 may input data (for example, cepstrum data) related to the first domain among acoustic data of the first quality to the trained second encoder model 900 to obtain third feature data (for example, cepstrum feature data). In addition, the processor 120 may input data (for example, pitch data) related to the second domain among the acoustic data of the first quality to the third encoder model 920 to obtain fourth feature data (for example, pitch feature data). The processor 120 may input the third feature data and the fourth feature data to the decoder model 930 to obtain waveform data of the second quality.

Figure 10:
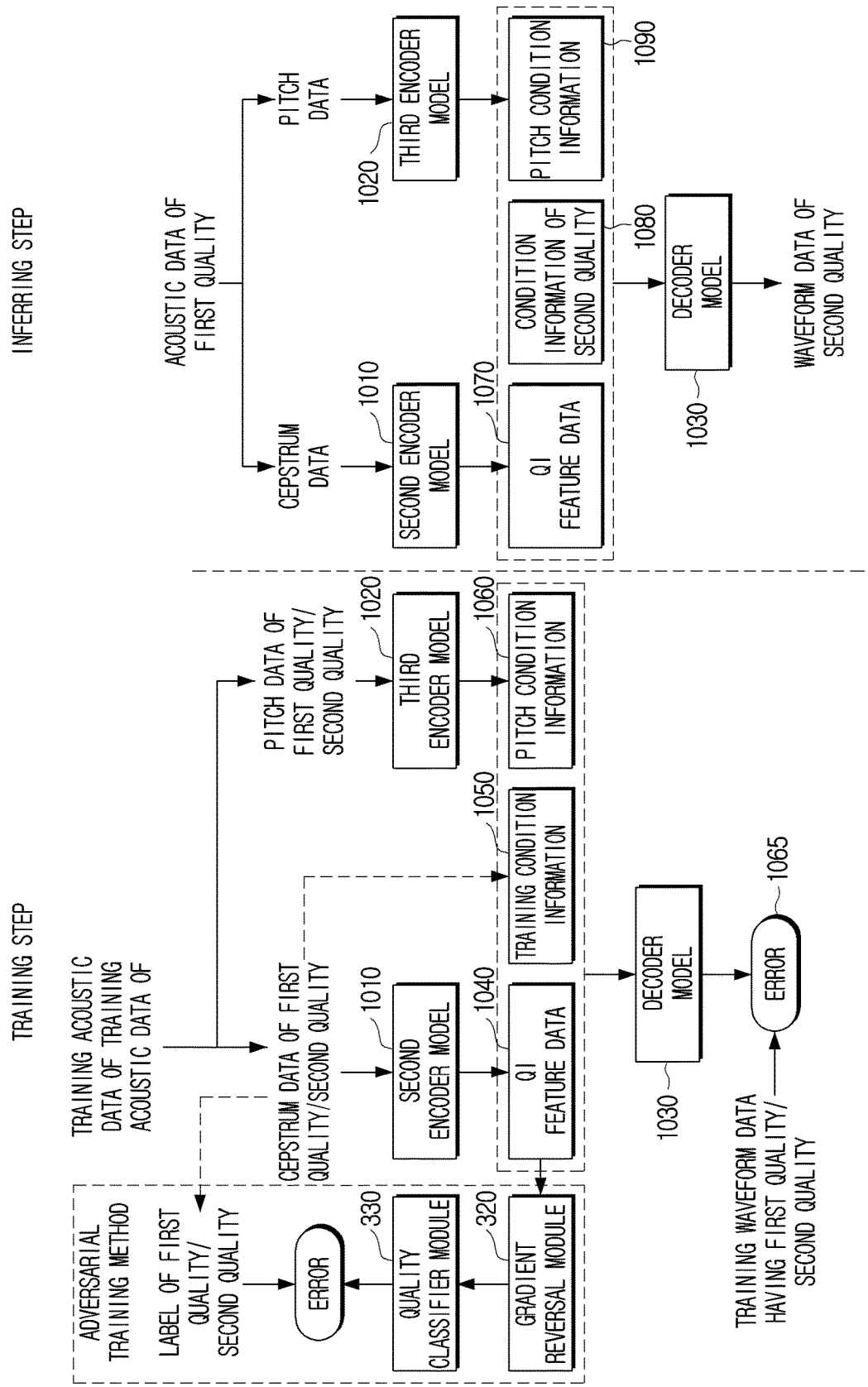

FIG. 10 is a view for describing a process of outputting waveform data with an improved quality related to a first domain by the electronic device 100 according to an embodiment of the disclosure. FIG. 10 is a view for describing a method of improving only quality related to a specific domain among acoustic data, as described with reference to FIG. 9.

The processor 120 may input data (for example, cepstrum data) related to the first domain of the first quality or the second quality among training acoustic data of the first quality or the second quality to a second encoder model 1010 to obtain QI feature data 1040. A process in which the second encoder model 1010 is trained to output QI feature data through an adversarial training method is the same as a process in which the first encoder model 310 of FIG. 3 is trained to output the QI feature data through an adversarial training method.

The processor 120 may input pitch data from among acoustic data of the first quality or the second quality to a third encoder model 1020 to obtain condition information 1060 (for example, pitch condition information) related to the second domain. The information related to the second domain may include information related to the second domain required when estimating waveform data.

The processor 120 may input the QI feature data 1040, training condition information 1050 corresponding to the quality of the data related to the first domain input to the second encoder model, and the condition information 1060 related to the second domain to a decoder model 1030 to obtain waveform data of a quality corresponding to the training condition information 1050. The processor 120 may train the decoder model 1030 based on an error 1065 between the obtained waveform data of the quality corresponding to the training condition information 1050 and training waveform data of a waveform corresponding to the training condition information 1050. That is, the decoder model 1030 may be trained to output waveform data with an improved quality related to the first domain.

In an inferring step, the processor 120 may input data (for example, cepstrum data) related to the first domain among acoustic data of the first quality to the trained second encoder model 1010 to obtain third feature data 1070. The processor 120 may input data (for example, pitch data) related to the second domain among the acoustic data of the first quality to the third encoder model 1020 to obtain condition information 1090 (for example, pitch condition information) related to the second domain.

The processor 120 may input the QI feature data 1070, the condition information 1090 related to the second domain, and condition information 1080 of the second quality to the decoder model 1030 to obtain waveform data of the second quality That is, the processor 120 may obtain waveform data with an improved quality related to the first domain through the decoder model 1030.

Figure 11:
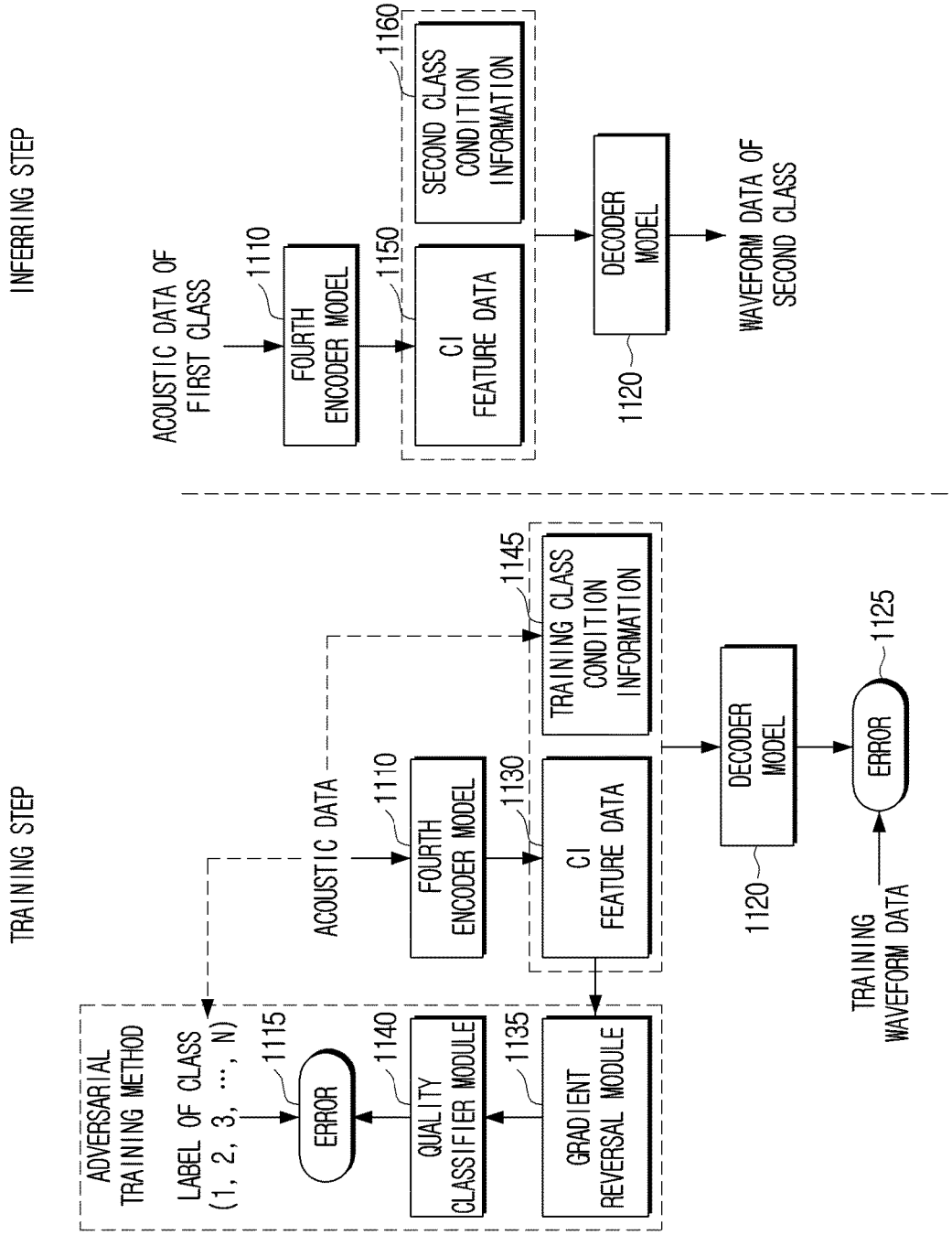
FIG. 11 is a view for describing a process of outputting waveform data of a plurality of classes by the electronic device according to an embodiment of the disclosure.

FIG. 11 is a view for describing a process of outputting waveform data of a plurality of classes by the electronic device 100 according to an embodiment of the disclosure.

In a training step, the processor 120 may input training acoustic data to a fourth encoder model 1110 to obtain feature data. The processor 120 may input the feature data to a class classifier module 1140 to obtain a class corresponding to the feature data. As illustrated in FIG. 11, the processor 120 inputs the feature data to a gradient reversal module 1135 before inputting the feature data to the class classifier module 1140, but in a forwarding step, the gradient reversal module 1135 outputs the feature data as it is.

The processor 120 may train the class classifier module 1140 by a back propagation method, or the like, based on an error 1115 between labels of the class corresponding to the feature data and a class corresponding to the acoustic data input to the fourth encoder model 1110.

The processor 120 may train the fourth encoder model 1110 so that the fourth encoder model 1110 outputs class-independent feature data (hereinafter, "CI feature data") 1130 by multiplying a gradient by a negative value (for example, −1) through the gradient reversal module 1135. Characteristics for the class may not be included in the CI feature data. A factor for the class may be disentangled from the CI feature data. Class condition information may include information on a waveform to be output by a decoder model 1120 (for example, class information on a waveform to be output).

The processor 120 may input training class condition information 1145 corresponding to the class of the acoustic data input to the fourth encoder model 1110 and the CI feature data 1130 to the decoder model 1120 to obtain waveform data having a class corresponding to the training class condition information 1145. That is, the training class condition information 1145 may include information on the class of the waveform to be output by the decoder model 1120.

The processor 120 may train the decoder model 1120 based on an error 1125 between the obtained waveform data and training waveform data having the class corresponding to the training class condition information 1145. That is, the decoder model 1120 may be trained to output the waveform data having the class corresponding to the training class condition information.

In an inferring step, the processor 120 may input acoustic data of a first class to the fourth encoder model 1110 to obtain CI feature data (for example, fourth feature data independent of the first class). The processor 120 may input the CI feature data 1150 and second class condition information 1160 to the decoder model 1120 to obtain waveform data of a second class. The second class condition information 1160 may include information on the class of the waveform to be output by the decoder model 1120.

As an example, it is assumed that the first class is a piano sound and the second class is a violin sound. The processor 120 may convert (or synthesize) the piano sound into the violin sound using the trained fourth encoder model 1110 with respect to acoustic data of the piano sound. As another example, it is assumed that the first class is a male voice and the second class is a female voice. The processor 120 may convert (or synthesize) the male voice into the female voice by using the trained fourth encoder model 1110 with respect to acoustic data of the male voice.

That is, the processor 120 may change a class of the acoustic data input to the fourth encoder model 1110 and condition information of a class input to the decoder model 1120 to obtain various waveform data.

Meanwhile, the training step described with reference to FIGS. 2 to 11 may be performed outside the electronic device 100. For example, each encoder model and decoder model may be trained in an external device (for example, a server) storing training data.

In addition, as an example, the electronic device 100 may receive a trained encoder model and decoder model from an external device using a communication module. As another example, the electronic device 100 may be mounted with a hardware module including a trained encoder model and decoder model from an external device. The electronic device 100 may perform the operation described in the inferring step of each drawing using the trained encoder model and decoder model.

Figure 12:
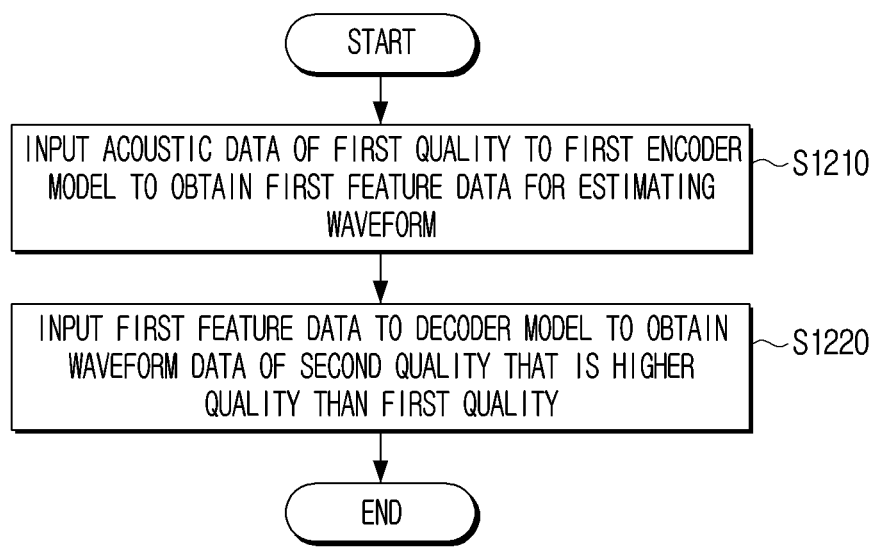
FIG. 12 is a flowchart for describing a control method of an electronic device according to an embodiment of the disclosure.

FIG. 12 is a flowchart for describing a control method of an electronic device 100 according to an embodiment of the disclosure.

The electronic device 100 may input acoustic data of a first quality to a first encoder model to obtain first feature data for estimating a waveform (operation S1210). In this case, the first encoder model refers to an artificial intelligence model trained to output feature data for estimating training waveform data of a second quality, which is a higher quality than the first quality, when training acoustic data of the first quality is input.

In an embodiment, the electronic device 100 may train the first encoder model based on an error between second feature data obtained by inputting the training acoustic data of the first quality to the first encoder model and the feature data for estimating the training waveform data having the second quality. In another embodiment, the electronic device 100 may train the first encoder model to output quality-independent first feature data through an adversarial training method.

The electronic device 100 may input the first feature data to a decoder model to obtain waveform data of the second quality (operation S1220).

In an embodiment, the electronic device 100 may train the decoder model to output the training waveform data of the second quality based on the feature data for estimating the training waveform data of the second quality. In another embodiment, the electronic device 100 may train the decoder model to output waveform data of a quality corresponding to the condition information based on the condition information of the waveform to be output by the decoder model and the first feature data.

Figure 13:
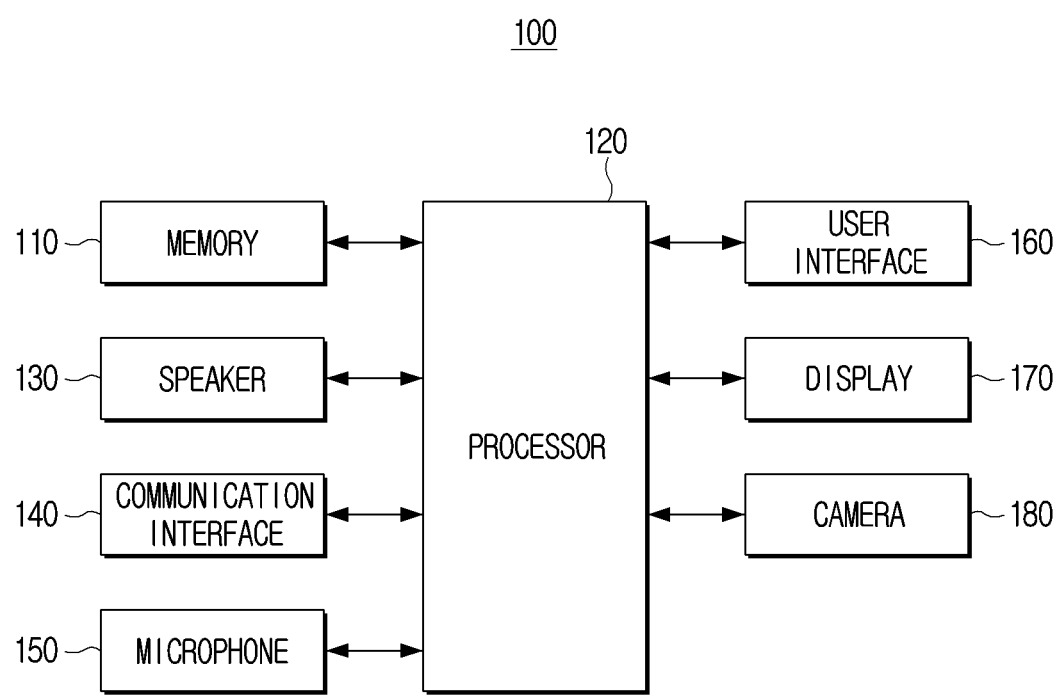
FIG. 13 is a block diagram illustrating components of the electronic device according to an embodiment of the disclosure in detail.

FIG. 13 is a block diagram illustrating components of the electronic device 100 according to an embodiment of the disclosure in detail. As illustrated in FIG. 13, the electronic device 100 may include the memory 110, the processor 120, a speaker 130, a communication interface 140, a microphone 150, a user interface 160, a display 170, and a camera 180. The memory 110 and the processor 120 have been described in detail with reference to FIGS. 1 to 11, and an overlapping description will thus be omitted.

The speaker 130 is a component configured to output various alarms or voice messages as well as various audio data on which various processing works such as decoding, amplification, and noise filtering are performed by the processor 120. For example, the processor 120 may perform various processing on the waveform data output from the trained decoder model. The speaker 130 may output the waveform data on which the processing has been performed.

Meanwhile, a component for outputting audio may be implemented as the speaker, but this is only an example, and the component for outputting audio may be implemented as an output terminal that may output audio data.

The communication interface 140 may include a circuit and perform communication with a plurality of groups of servers, a plurality of groups of external devices, or other devices. The communication interface 140 may include various communication modules to perform communication with an external device.

As an example, the communication interface 140 may include a wireless communication module such as, for example, a cellular communication module that uses at least one of long-term evolution (LTE), LTE Advance (LTE-A), code division multiple access (CDMA), wideband CDMA (WCDMA), universal mobile telecommunications system (UMTS), wireless broadband (WiBro), 5th generation (5G), or global system for mobile communications (GSM). As another example, the wireless communication module may use at least one of, for example, wireless fidelity (Wi-Fi), Bluetooth, Bluetooth low energy (BLE), or Zigbee.

The communication interface 140 may receive training data for training each encoder model and decoder model from an external device. As another example, the communication interface 140 may receive a trained encoder model and decoder model from an external device. As another example, the communication interface 140 may receive acoustic data to be input to the encoder model from an external device.

The microphone 150 receives a user's voice input. As an example, the microphone 150 may receive a trigger voice input (or wake-up voice input) indicating the start of voice recognition through a dialogue system, and may receive a user query for requesting specific information. As an example, the voice input received from the microphone 150 may be input to the dialogue system by the processor 120.

Meanwhile, the microphone 150 may be provided inside the electronic device 100, but may be provided outside the electronic device 100 and electrically connected to the electronic device 100. As another example, the microphone 150 may be provided outside the electronic device 100 and communicatively connected to the electronic device 100.

The user interface 160 may receive a user input for controlling the electronic device 100. In particular, the user interface 160 may include a touch panel for receiving a user touch using a user's hand, a stylus pen or the like, a button for receiving a user manipulation, and the like. In addition, the user interface 160 may be implemented as another input device (for example, a keyboard, a mouse, or a motion input).

The display 170 may display various information according to the control of the processor 120. As an example, the display 170 may display an indicator indicating that waveform data has been output through the decoder model. As another example, the display 170 may display a class (for example, a type of quality) corresponding to the acoustic data or the feature data input to each encoder and decoder model.

The display 170 may be implemented by various display technologies such as a liquid crystal display (LCD), an organic light emitting diode (OLED), an active-matrix OLED (AM-OLED), a liquid crystal on silicon (LcoS), and digital light processing (DLP).

In addition, the display 170 may be coupled to at least one of a front area, a side area, or a rear area of the electronic device 100 in the form of a flexible display. In addition, the display 170 may be implemented as a touch screen including a touch sensor.

The camera 180 is a component capable of obtaining one or more images by photographing the surrounding of the electronic device 100. For example, the camera 180 may obtain a moving picture including a plurality of image frames by photographing the surrounding of the electronic device 100. As an example, acoustic data on a sound included in the moving picture obtained through the camera 180 may be input to the encoder model by the processor 120.

Meanwhile, it is to be understood that technologies mentioned in the disclosure are not limited to specific embodiments, but include all modifications, equivalents, and/or alternatives according to embodiments of the disclosure. Throughout the accompanying drawings, similar components will be denoted by similar reference numerals.

In the disclosure, an expression "have", "may have", "include", or "may include" indicates existence of a corresponding feature (for example, a numerical value, a function, an operation, or a component such as a part), and does not exclude existence of an additional feature.

In the disclosure, an expression "A or B", "at least one of A and/or B", or "one or more of A and/or B", may include all possible combinations of items enumerated together. For example, "A or B", "at least one of A and B", or "at least one of A or B" may indicate all of 1) a case where at least one A is included, 2) a case where at least one B is included, or 3) a case where both of at least one A and at least one B are included.

Expressions "first" or "second" used in the disclosure may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, in some situations, an expression "apparatus configured to" may mean that the apparatus may "do" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

Meanwhile, terms "~er/or" or "module" used in the disclosure may include units configured by hardware, software, or firmware, and may be used compatibly with terms such as, for example, logics, logic blocks, components, circuits, or the like. The term "~er/or" or "module" may be an integrally configured component or a minimum unit performing one or more functions or a part thereof. For example, the module may be configured by an application-specific integrated circuit (ASIC).

The diverse embodiments of the disclosure may be implemented by software including instructions stored in a machine-readable storage medium (for example, a computer-readable storage medium). A machine may be a device that invokes the stored instruction from the storage medium and may be operated depending on the invoked instruction, and may include the electronic device (for example, the electronic device 100) according to the disclosed embodiments. In a case where a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory storage medium' means that the storage medium is tangible without including a signal, and does not distinguish whether data are semi-permanently or temporarily stored in the storage medium. As an example, the 'non-transitory storage medium' may include a buffer.

According to an embodiment, the methods according to the diverse embodiments disclosed in the document may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

Each of the components (for example, modules or programs) according to the diverse embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

What is claimed is:

1. An electronic device comprising:
a memory; and
a processor configured to:
input acoustic data of a first quality into a first encoder model to obtain first feature data for estimating a waveform; and
input the first feature data into a decoder model to obtain waveform data of a second quality that is higher quality than the first quality,
wherein the first encoder model is trained to output second feature data for estimating training waveform data of the second quality based on training acoustic data of the first quality being input, the processor is further configured to:
input training acoustic data of the second quality to a second encoder model to obtain the second feature data for estimating the training waveform data of the second quality, wherein the training acoustic data of the first quality is not input into the second encoder model,
train the first encoder model based on an error between second feature data, obtained by inputting the training acoustic data of the first quality into the first encoder model, and the feature data for estimating the training waveform data of the second quality,
input the feature data for estimating the training waveform data of the second quality to the decoder model to obtain waveform data, and
train the decoder model based on an error between the obtain waveform data and the training waveform data of the second quality.

2. The electronic device according to claim 1, wherein the processor is further configured to:
input the first feature data into a restoration model to obtain acoustic data of the second quality for restoring feature data for estimating a waveform to acoustic data; and
wherein the restoration model is trained to output training acoustic data of the second quality based on training feature data of the first quality being input.

3. The electronic device according to claim 1, wherein the processor is further configured to:
input first acoustic data related to a first domain among the acoustic data of the first quality into a second encoder model to obtain second feature data;
input second acoustic data related to a second domain among the acoustic data of the first quality into a third encoder model to obtain third feature data; and
obtain the waveform data of the second quality corresponding to the first domain based on inputting the second feature data and the third feature data into the decoder model,
wherein the second encoder model is trained to output feature data for estimating training waveform data of the second quality corresponding to the first domain, based on first training acoustic data related to the first domain among the training acoustic data of the first quality being input.

4. The electronic device according to claim 1, wherein the processor is further configured to:
input first characteristic data and condition information of the waveform to be output by the decoder model into the decoder model to obtain the waveform data corresponding to the condition information,
wherein the first encoder model is trained to output quality-independent first feature data through an adversarial training method.

5. The electronic device according to claim 4, wherein the processor is further configured to:
train the decoder model to output the waveform data of the second quality using the first feature data based on training condition information indicating that the waveform to be output by the decoder model is the waveform of the second quality; and
train the decoder model to output waveform data of the first quality using the first feature data based on the training condition information indicating that the waveform to be output by the decoder model is the waveform of the first quality.

6. The electronic device according to claim 5, wherein the processor is further configured to:
input the first feature data and the condition information into a restoration model for restoring feature data for estimating the waveform to obtain the acoustic data corresponding to the condition information,
wherein the restoration model is trained to output the acoustic data corresponding to the training condition information based on training feature data of the first quality and the training condition information being input.

7. The electronic device according to claim 5, wherein the processor is further configured to:
input a label indicating the second quality or acoustic data of the second quality into a condition model to obtain the condition information indicating that the waveform to be output by the decoder model is the waveform of the second quality;
input the condition information, indicating that the waveform to be output by the decoder model is the waveform of the second quality, and the first feature data into the decoder model to obtain the waveform data of the second quality.

8. The electronic device according to claim 1, wherein the processor is further configured to:
input the acoustic data of the first quality to an improvement model trained to improve a quality to obtain the acoustic data of the second quality;
input the acoustic data of the second quality into the first encoder model to obtain feature data having an improved quality as compared with the first feature data;
input the feature data with the improved quality as compared with the first feature data into the decoder model to obtain an excitation signal;
input the excitation signal and the acoustic data of the second quality into a signal processing model to obtain the waveform data of the second quality.

9. The electronic device according to claim 1, wherein the processor is further configured to:
input acoustic data of a first class, of a plurality of classes, into a fourth encoder model trained to output feature data independent of the plurality of classes through an adversarial training method to obtain second feature data independent from the first class;
input the second feature data and condition information, indicating that the waveform to be output by the decoder model is the waveform of a second class of the plurality of classes, into the decoder model to obtain waveform data of the second class.

10. A control method of an electronic device, the control method comprising:
inputting acoustic data of a first quality into a first encoder model to obtain first feature data for estimating a waveform;
inputting the first feature data into a decoder model to obtain waveform data of a second quality that is higher quality than the first quality,
wherein the first encoder model is trained to output second feature data for estimating training waveform data of the second quality based on training acoustic data of the first quality being input, by
inputting training acoustic data of the second quality to a second encoder model to obtain the second feature data for estimating the training waveform data of the second quality, wherein the training acoustic data of the first quality is not input into the second encoder model,
training the first encoder model based on an error between and feature data obtained by inputting the training acoustic data of the first quality into the first encoder model and the feature data for estimating the training waveform data of the second quality,
inputting the feature data for estimating the training waveform data of the second quality to the decoder model to obtain waveform data, and
training the decoder model based on an error between the obtained waveform data and the training waveform data of the second quality.

11. The control method according to claim 10, further comprising:
inputting the first feature data to a restoration model to obtain acoustic data of the second quality for restoring feature data for estimating a waveform to acoustic data; and
wherein the restoration model is trained to output training acoustic data of the second quality based on training feature data of the first quality being input.

12. The control method according to claim 10, further comprising:
inputting first acoustic data related to a first domain among the acoustic data of the first quality into a second encoder model to obtain second feature data;
inputting second acoustic data related to a second domain among the acoustic data of the first quality into a third encoder model to obtain third feature data; and
inputting the second feature data and the third feature data into the decoder model to obtain the waveform data of the second quality corresponding to the first domain,
wherein the second encoder model is trained to output feature data for estimating training waveform data having an improved quality corresponding to the first domain, based on first training acoustic data related to the first domain among the training acoustic data of the first quality being input.

13. The control method according to claim 10, further comprising:
inputting first characteristic data and condition information of a waveform to be output by the decoder model into the decoder model to obtain waveform data corresponding to the condition information,
wherein the first encoder model is trained to output quality-independent first feature data through an adversarial training method.

* * * * *